Patented Feb. 13, 1923.

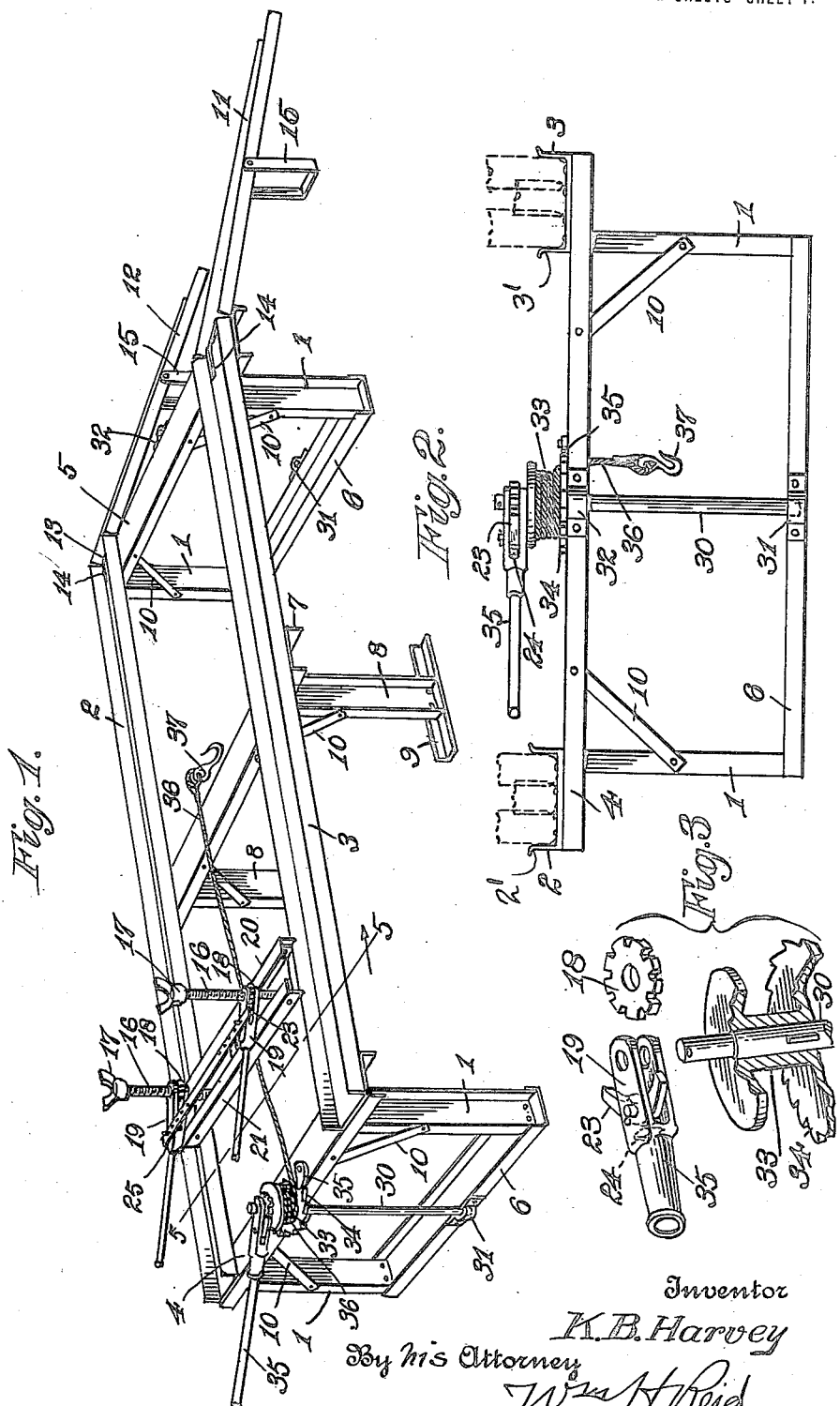

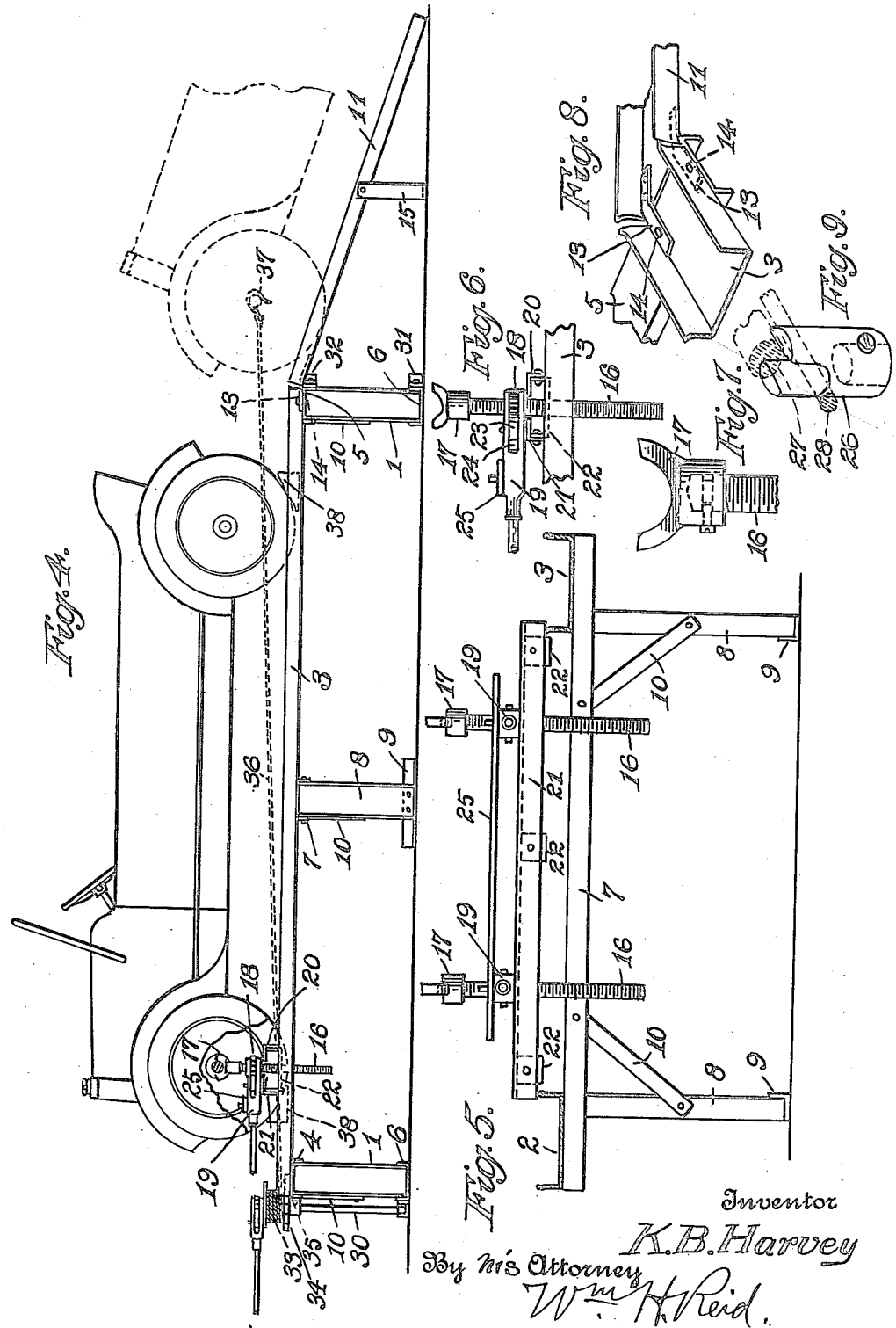

1,445,394

UNITED STATES PATENT OFFICE.

KELLY B. HARVEY, OF NEW YORK, N. Y.

AUTO TABLE.

Application filed August 1, 1921. Serial No. 489,063.

*To all whom it may concern:*

Be it known that I, KELLY B. HARVEY, a citizen of the United States, and a resident of New York city, in the county of New York and State of New York, have invented certain new and useful Improvements in Auto Tables, of which the following is a specification.

The object of the present invention is to provide an apparatus that will permit an automobile of any kind to be placed on a support elevated a few feet above the ground or floor, which vehicle can be caused to run up thereon by an incline, by its own power or by a windlass on the apparatus to facilitate inspection and operation of the vehicle.

A further object of the invention is to provide means for raising the front or rear part of the vehicle on this frame to lift the wheels therefrom.

In the accompanying drawings showing one embodiment of my invention, Figure 1 is a perspective view thereof.

Fig. 2 is an end view.

Fig. 3 shows the separate parts of the capstan.

Fig. 4 is a side elevation indicating the vehicle on the apparatus, and also the mode of drawing the vehicle up on to the device.

Fig. 5 is an intermediate section.

Figs. 6 and 7 show one of the jacks.

Fig. 8 shows the detachable inclined bar.

Fig. 9 shows a special bearing head for the jacks.

The device comprises essentially a pair of channel bars connected at their ends by cross bars, with an upright bar at each end of the cross bar, and a base bar connecting the ends of the upright bars; in connection with channel bars, detachably connected with one end of each side bar. In the construction set forth, I provide a pair of bars 2 and 3 of channel form that are suitably secured to cross bars 4 and 5 at their ends that may also be channel bars inverted as shown. These bars may be secured by bolts or rivets with the said bars spaced apart to receive the wheels of a motor vehicle. These channel bars 2 and 3 are preferably of considerable width to accommodate different tread of vehicles, commercial vehicles usually having a wider tread than pleasure vehicles. The cross bars 4 and 5, are supported at their ends by four upright bars 1, 1, also preferably of channel section that may be secured by bolts or rivets to the cross bars; and at each end of the device the upright bars 1 are connected by a base bar 6, preferably of channel form as shown, suitably secured thereto.

If desired the middle portion of the side members 2 and 3 may be supported by a cross bar 7, having upright bars 8, 8, at the ends, also of channel form, with a suitable foot piece 9 at the lower end, preferably of angle iron as shown. If desired supporting strips 10 may be secured between the upright and the cross members as shown.

At one end of the device I provide a pair of bars 11 and 12 of channel form that are detachably secured at the ends of the side bars 2 and 3 and extend down to the floor or ground, being provided with middle straps 13 secured to the inclined bars, and adapted to have a bolt 14 pass through holes in the straps and the top bars, see Fig. 8. If desired the support may be provided at the middle of each of these inclined channel bars, such as a middle bar 15 bent to the form of a U and secured to swing at each side of the inclined bar as shown.

In order to raise the wheels of the vehicle from the side bars 2 and 3, I provide tandem jacks that can engage either of the axles or the underside mechanism of the vehicle or the frame of the chassis. These are substantially duplicate and each comprises a screw-threaded shaft 16, see Fig. 6, having a forked swivel block 17, at the top of each shaft. This shaft turns in a ratchet wheel 18 having a screw-threaded bore, and a lever 19 is forked to receive the nut member 18 and rests by its lower face on a cross supporting member. The latter is shown as formed by a pair of angle bars 20, 21, secured together by channel pieces 22 near the ends and also at the middle portion. This cross member rests loosely on the side bars 2 and 3 as shown and can be advanced along the same to any desired position. The lever 19 carries a double pawl 23 that can be held by a spring 24 to bring either end to engage the ratchet wheel so that swinging the lever will raise or lower the screw shaft 16. It will be further understood that each of these jacks is slidable along the cross-supporting member to a desired position. These levers may be caused to swing in unison by means of a connecting bar 25 having holes for bolts loose in the levers, thus swinging of either lever will operate the other to raise or lower the jacks together.

Instead of the usual form of yoke 17 I can substitute a special swivel member 26 having its upper part 27 forked to engage the axle and to straddle the truss rod 28 frequently used below the rear axle of an automobile as shown.

While an automobile may be run up the incline up to the side members by its own power, sometimes if the engine is disabled it is necessary to use other means and I provide a windlass device for this purpose. An upright shaft 30 is mounted in bearings 31, 32, on the cross members at either end and has a drum 33 secured thereto, whose lower part 34 is in the form of a ratchet wheel adapted to engage a pawl 35 on the cross bar 4. Another ratchet wheel or tooth wheel 18 is secured to the upper end of the shaft 33, and engages a lever 35 carrying a double pawl as 23. By this means the drum is rotated and a cable 36 on the drum can engage the auto by a hook 37 and thus easily draw the vehicle up and on the side members.

A device of this kind being formed chiefly from channel bars is easily and cheaply constructed yet will be strong and rigid to support the vehicle. The tandem jacks can be used to raise the rear axle or the front axle or can engage the frame where desired.

When the vehicle is in the desired position, I employ locks in the nature of a chock 38 at each side of two of the wheels that will prevent the car from shifting. I also employ an adjustable clamping device in the form of a chain and turn-buckle as shown in Figs. 12 and 13. The turn-buckle assembly comprises a right and left thread nut member 40 having a hook 41 at one end and a fork portion 42 at the other end of the screw members of the turn-buckle. A bolt 44 in the fork 42, carries a chain 43 and a grab hook 45 on the other end of the chain. In use of this device the hook 41 engages a suitable part of the vehicle, such as the frame, while the chain is passed around one of the side bars 2 or 3 and the hook 45 caused to engage the link end of chain 43. This serves to tightly secure the vehicle on the side bar, when the turn-buckle is tightened.

The upper corners of the flanges on the side bars 2 and 3 are bent outwardly as indicated at 2ˣ and 3ˣ, so that the points cannot engage the rubber tires that would produce injury thereto. The inclined bars 11 and 12 are similarly constructed which arrangement facilitates the entrance of the wheel on to these members.

What I claim is:

1. In a device as set forth, the combination with side channel bars of a transverse jack member consisting of a pair of angle bars extending across with their ends resting on the channel bars, a channel section secured to the angle bars at the mid-section and at each end portion, a pair of jacks carried by the angle bars and provided with operating handles and means to connect said handles to cause them to operate in unison.

2. In a device as set forth, the combination with side channel bars of a transverse jack member consisting of a pair of angle bars extending across with their ends resting on the channel bars, a channel section secured to the angle bars at each end portion, a pair of jacks carried by the angle bars and each provided with an operating handle, and connecting means for causing the handles to operate in unison.

3. In a device as set forth, the combination with side channel bars of a transverse jack member consisting of a pair of angle bars extending across with their ends resting on the channel bars, a channel section secured to the angle bars at each end portion, and a pair of jacks carried by the angle bars, said jacks being adjustable along the angle bars, and means for connecting the jacks in the adjusted positions to cause them to operate in unison.

4. In a device of the kind described, a pair of jacks each having an operating handle, and means to connect said handles to cause them to operate in unison.

5. In a device of the kind described, a pair of jacks each having an operating handle, the handles of the jacks being positioned to oscillate in substantially the same plane, and a rigid bar connecting said handles whereby movement of one handle will effect movement of the other handle.

6. In a device of the kind described, a pair of jacks each having an operating handle, and a handle connecting member, said handles and member having cooperating means to enable connection of the handles to the member at different spacings of the jacks.

7. In a device of the kind described, a pair of jacks mounted for movement toward and from each other, each of said jacks being provided with an operating handle, said handles being arranged to oscillate in substantially the same plane, a handle connecting bar whereby operation of one handle will cause operation of the other in unison.

Signed at New York city, N. Y., on July 29th, 1921.

KELLY B. HARVEY.